3,432,477
POLY(TRANS-1,2-CYCLOBUTYLENE ADIPAMIDE) AND FIBERS THEREOF
Peter William Foster, Geneva, Switzerland, assignor to E. I. du Pont de Nemours and Company, Wilmington, Del., a corporation of Delaware
No Drawing. Filed June 4, 1965, Ser. No. 461,507
U.S. Cl. 260—78  2 Claims
Int. Cl. C08g 41/02, 20/00; D01d 5/10

ABSTRACT OF THE DISCLOSURE

Poly(trans-1,2-cyclobutylene adipamide) suitable for the preparation of textile fibers.

---

This invention pertains to a novel, synthetic, linear polycarbonamide. More particularly, it pertains to the condensation polymer formed from trans-1,2-diaminocyclobutane and adipic acid.

Synthetic, linear polycarbonamides have been widely used in textile fibers, films, coatings, adhesives, and the like. For polycarbonamides to be suitable for use in textile fiber applications, they must possess properties which are appropriate for such a use. Their melting temperature, for example, is a key property because it must be high enough to withstand ironing of the fabric formed thereof, yet be low enough for spinning into a fiber without decomposition or thermal degradation of the polymer. Suitable polycarbonamides typically have melting temperatures within the approximate range of 230–320° C.

A common desired property of the class of polycarbonamides is that they be "fiber-forming." The term "fiber-forming" is used generally, as well as herein, to indicate that a polymer is capable of being formed directly into useful fibers without further treatment. This means the polymer is melt spinnable. The fiber-forming stage can be tested for by touching a molten sample of polymer with a rod and drawing the rod away; if the stage has been reached, a continuous filament of considerable strength and pliability is readily formed.

The prior art has shown that the fiber-forming stage is reached when the polymer has an inherent viscosity of about 0.4. The term "inherent viscosity" is defined generally, as well as herein, by the formula $$\frac{\log_e N_r}{C}$$

in which $N_r$ (relative viscosity) is the viscosity of a dilute solution (i.e., 0.5% by weight) of the polymer in m-cresol divided by the viscosity of m-cresol in the same units and at the same temperature (i.e., 25° C.) and C is the concentration in grams of polymer per 100 cc. of solution. Intrinsic viscosity is defined as the limit of the inherent viscosity as the concentration approaches zero. At this low concentration, the inherent viscosity is a good approximation to the intrinsic viscosity.

It has heretofore been suggested to prepare polycarbonamides containing recurring 1,2-cyclobutylene radicals in the polymer chain. They have been generally characterized, however, by melting temperatures too low for use in textile fibers and/or by viscosities which are too low for the polymer to be fiber-forming. For example, U.S. Patent No. 3,074,914 shows that attempts to form a polymer from 1,2-cyclobutane dicarboxylic acid and hexamethylene diamine resulted in a low melting and low viscosity polymer. It was shown therein, that among polymers containing recurring cyclobutylene radicals, a higher melting temperature is obtained in those containing more symmetrical cyclobutane derivative constituents. This teaches that polymers containing a recurring 1,3-cyclobutylene radical would be expected to have a higher melting temperature than those containing the 1,2-radical.

Other polycarbonamides are known which proposed the use of highly substituted cyclobutylene radicals to overcome the difficulties in producing suitable polymers.

It is the object of this invention to provide a novel, synthetic, linear polycarbonamide containing recurring unsubstituted 1,2-cyclobutylene radicals, which is fiber-forming and is suitable for use in textile fibers.

In accordance with this invention there is formed a polycarbonamide in which the carbonamide linkages are an integral part of the polymer chain, said polycarbonamide consisting essentially of poly(trans-1,2-cyclobutylene adipamide) shown structurally as consisting essentially of recurring units of the formula:

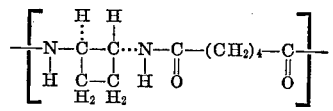

wherein the heavy line represents a valence bond above the plane formed by the carbon atoms of the cyclobutylene group, and the dotted line represents a valence bond below the plane formed by the carbon atoms of the cyclobutylene group (i.e., the trans configuration). This polymer is advantageously formed by reacting trans-1,2-cyclobutane diamine with adipic acid under polycondensation conditions until a polymer having an inherent viscosity of at least about 0.4 is obtained.

Quite unexpectedly, poly(trans-1,2-cyclobutylene adipamide) has been found to possess a polymer melting temperature highly suitable for use in synthetic textile fibers. Also quite unexpectedly, poly(trans-1,2-cyclobutylene adipamide) has been found to be readily polymerized to an inherent viscosity sufficiently high for melt spinning purposes.

The following example is provided to promote a better understanding of the invention but in no way is intended to limit the scope thereof.

EXAMPLE

Trans-1,2-dicarboxycyclobutane was converted to trans-1,2-diaminocyclobutane via a Schmidt reaction in the following manner. A solution of 36.8 grams hydrazoic acid in 450 ml. chloroform is added dropwise to a solution of 50 grams trans-1,2-dicarboxycyclobutane in 115 ml. concentrated sulfuric acid at 40° C. After the addition is complete, the mixture is left to stir at room temperature for 2½ days. The chloroform is then evaporated leaving a strong sulfuric acid solution of the diamine. This is neutralized with potassium hydroxide and the diamine extracted with ether and dried. The trans-1,2-diaminocyclobutane distills at a boiling point of 83–84° C. under 54 millimeters of mercury pressure. The product has a neutralization equivalent of 43.8 (theoretical 43.1), and vapor phase chromatography indicates it to be 99.6% pure.

A salt is prepared from 5.7 grams trans-1,2-diaminocyclobutane and 9.5 grams adipic acid in 66.5 ml. warm ethanol. Immediate precipitation of the salt occurs and the mixture is cooled overnight at 0° C. and filtered. The reaction yields 14.5 grams of the dried salt which has a melting point 145–160° C.

The salt is sealed in a glass tube under nitrogen atmosphere and heated at 220° C. for three hours under autogenous pressure. The polymer so formed is then further polymerized by heating at 255° C. for 1½ hours using a nitrogen bleed to carry off evolved water. The polymerization is completed by heating for ½ hour at 255° C. under vacuum. The resulting polyamide has a melting temperature of about 285° C. and an inherent viscosity of 0.54, as previously defined, in a solution containing 0.5 gram of polymer in 100 cc. m-cresol at 25° C.

The polymer is found to be fiber-forming, melt spinnable and because of its favorable melting temperature, is suitable for use in the preparation of synthetic textile fibers.

In contrast to the high melting polymer prepared above, a low melting polymer is obtained by replacing the trans-1,2-diaminocyclobutane with the closely related trans-1,2-bis(aminomethyl)cyclobutane. The latter polymer has a melting temperature of about 200° C.

The novel polycarbonamide of this invention is a fiber-forming, synthetic, linear polycarbonamide in which the carbonamide linkages form an integral part of the polymer chain and which, upon hydrolysis, yields trans-1,2-diaminocyclobutane and adipic acid. The polycarbonamide can be prepared by polymerization of a salt from the reaction of equivalent proportions of the diamine and the dicarboxylic acid. An alternate procedure which can be employed is to react the diamine with an amide-forming derivative of adipic acid by procedures well known in the prior art. The term "amide-forming derivative of adipic acid" includes derivatives such as esters or acid chlorides of adipic acid.

The polycarbonamide of this invention is useful for the preparation of textile fibers, both monofilaments and yarns. It can be used as a homopolymer, or blended or co-spun with other polymers by procedures well known in the art. It can contain conventional additives, such as stabilizers, antioxidants, delusterants, pigments, dyes anti-static agents, and the like. Other aspects of this invention will be obvious to those skilled in the art.

The polycarbonamide of this invention has properties which make it suitable as a melt spinnable textile fiber. Its suitable melting temperature and an inherent viscosity of greater than .4 would be unexpected from consideration of the prior art. Based on the differences between the polycarbonamide of this invention and related ones of the prior art, the prior art does not indicate that these greatly improved and unexpected results would be found.

It is to be understood that the foregoing description is by way of example only and that various modifications and changes in the details may be made without departing from the spirit of the invention and the scope of the following claims.

What is claimed is:

1. Poly(trans-1,2-cyclobutylene adipamide) having an inherent viscosity of at least 0.4, as measured at 25° C. in m-cresol at a concentration of 0.5% by weight, the polycarbonamide consisting essentially of recurring units of the formula:

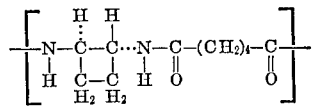

2. A fiber of the polycarbonamide as defined by claim 1.

References Cited

UNITED STATES PATENTS

| | | | |
|---|---|---|---|
| 3,017,395 | 1/1962 | Elam et al | 260—78 |
| 3,074,914 | 1/1963 | Armen | 260—78 |
| 3,154,524 | 10/1964 | Martinek | 260—78 |

WILLIAM H. SHORT, *Primary Examiner.*

H. D. ANDERSON, *Assistant Examiner.*

U.S. Cl. X.R.

260—33.4; 264—176; 57—140